(12) United States Patent
Chakravarthy et al.

(10) Patent No.: US 10,326,727 B2
(45) Date of Patent: Jun. 18, 2019

(54) METHODS AND SYSTEMS OF APPLICATION MESSAGE ADDRESSING

(71) Applicants: Sriram Chakravarthy, Saratoga, CA (US); Rammohan G. Menon, Los Altos, CA (US); Madhav Menon, San Jose, CA (US)

(72) Inventors: Sriram Chakravarthy, Saratoga, CA (US); Rammohan G. Menon, Los Altos, CA (US); Madhav Menon, San Jose, CA (US)

( * ) Notice: Subject to any disclaimer, the term of this patent is extended or adjusted under 35 U.S.C. 154(b) by 151 days.

(21) Appl. No.: 15/081,937

(22) Filed: Mar. 28, 2016

(65) Prior Publication Data

US 2016/0330161 A1 Nov. 10, 2016

Related U.S. Application Data

(63) Continuation-in-part of application No. 14/738,820, filed on Jun. 12, 2015, now Pat. No. 9,565,305.

(60) Provisional application No. 62/146,374, filed on Apr. 12, 2015.

(51) Int. Cl.
| | |
|---|---|
| *H04L 29/08* | (2006.01) |
| *H04L 12/58* | (2006.01) |
| *H04W 4/16* | (2009.01) |
| *H04M 3/42* | (2006.01) |
| *H04M 3/51* | (2006.01) |

(52) U.S. Cl.
CPC .............. *H04L 51/28* (2013.01); *H04L 51/30* (2013.01); *H04L 67/26* (2013.01); *H04W 4/16* (2013.01); *H04L 51/32* (2013.01); *H04M 3/42382* (2013.01); *H04M 3/51* (2013.01)

(58) Field of Classification Search
CPC ......... H04L 51/28; H04L 51/30; H04L 67/26; H04L 51/32; H04M 3/42382; H04M 3/51; H04W 4/16
See application file for complete search history.

(56) References Cited

U.S. PATENT DOCUMENTS

2013/0290436 A1* 10/2013 Martin ................. G06Q 10/107
709/206
2014/0280609 A1* 9/2014 Averbeck ............... H04L 51/34
709/206

* cited by examiner

*Primary Examiner* — Kim T Nguyen

(57) ABSTRACT

In one aspect, a computerized method for implementing an application messaging service includes the step of providing a messaging application that enables a user to generate an application message. The method includes the step of receiving a list of application message addressees. The method includes the step of receiving a designated reply addressee. The method includes the step of communicating the application message to the application message addressees in the list of application message addressees. The method includes the step of receiving one or more replies from one or more of the application message addressees. The method includes the step of communicating the one or more replies from one or more of the application message addressees to the designated reply addressee.

4 Claims, 6 Drawing Sheets

METHODS AND SYSTEMS OF APPLICATION MESSAGE ADDRESSING

CROSS-REFERENCE TO RELATED APPLICATIONS

This application is a claims priority from provisional U.S. Application Provisional No. 62/146,374 filed 12 Apr. 2015. This application is hereby incorporated by reference in its entirety. This applications claims priority from U.S. patent application Ser. No. 14/738,820 filed on Jun. 12, 2015. This application is hereby incorporated by reference in its entirety.

FIELD OF THE INVENTION

This application relates generally to application messaging, and more specifically to a system, article of manufacture and method of application message addressing.

DESCRIPTION OF THE RELATED ART

In an enterprise an application message can be addressed to multiple addressees. The sender may not want to receive a reply from all the addressees. Additionally, the sender may want statistics and other information about how the addressees accessed the application message. The sender may prefer that other members of the enterprise receive this information as well as the replies. Accordingly, improvements to application messaging systems and methods are desired.

BRIEF SUMMARY OF THE INVENTION

In one aspect, a computerized method for implementing an application messaging service includes the step of providing a messaging application that enables a user to generate an application message. The method includes the step of receiving a list of application message addressees. The method includes the step of receiving a designated reply addressee. The method includes the step of communicating the application message to the application message addressees in the list of application message addressees. The method includes the step of receiving one or more replies from one or more of the application message addressees. The method includes the step of communicating the one or more replies from one or more of the application message addressees to the designated reply addressee.

Figure 1:
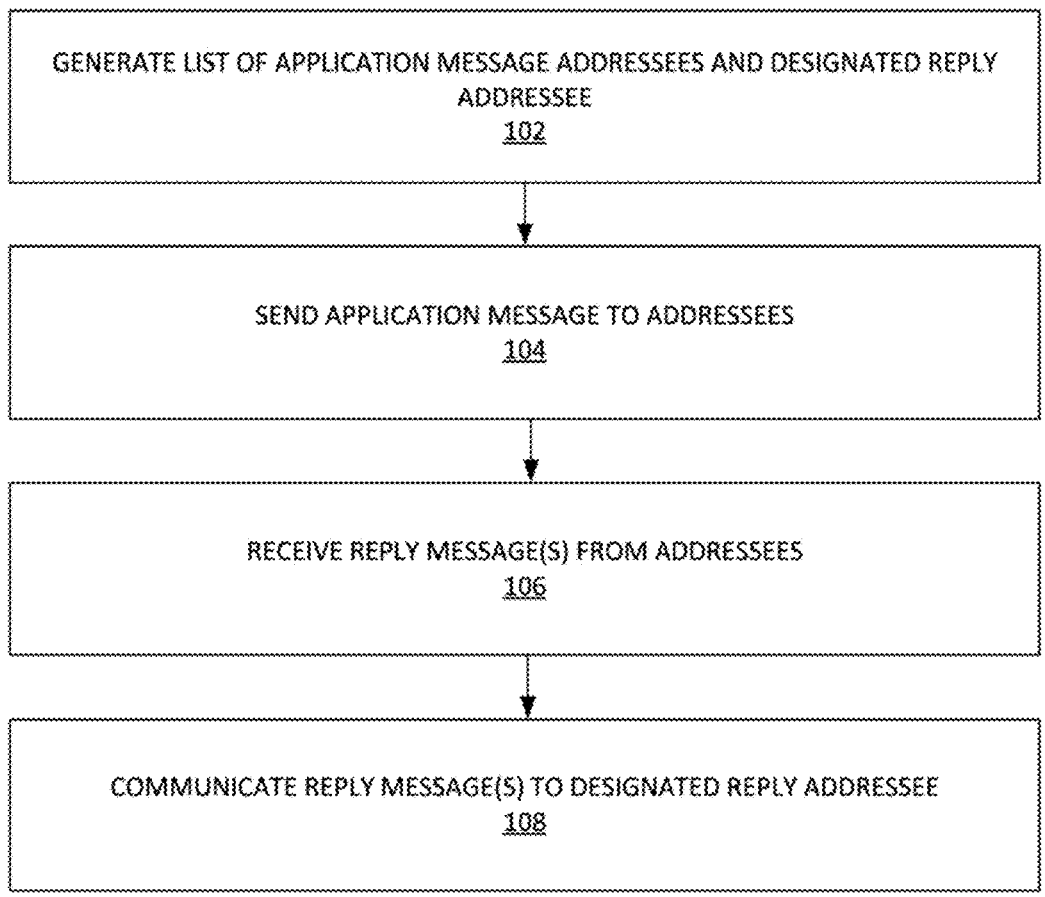
FIG. 1 illustrates an example process for implementing an application messing service when a message application is temporarily offline, according to some embodiments.

The Figures described above are a representative set, and are not an exhaustive with respect to embodying the invention.

DESCRIPTION

Disclosed are a system, method, and article of application messaging. The following description is presented to enable a person of ordinary skill in the art to make and use the various embodiments. Descriptions of specific devices, techniques, and applications are provided only as examples. Various modifications to the examples described herein can be readily apparent to those of ordinary skill in the art, and the general principles defined herein may be applied to other examples and applications without departing from the spirit and scope of the various embodiments.

Reference throughout this specification to "one embodiment," "an embodiment," 'one example,' or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art can recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, and they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Definitions

Example definitions for some embodiments are now provided.

Application messages (e.g. text messages and/or electronic messages) can be between two or more mobile device and/or fixed over a phone network, a cellular network and/or a computer network (e.g. the Internet). Example application messages include, inter alia: Short Message Service (SMS), Multimedia Messaging Service, instant messaging, online social network messages, microblogging, an in-application message, bulk text messages, and/or other standards of telephone/cellular/computer network messaging.

Application programming interface (API) can specify how software components of various systems interact with each other.

Cloud computing can involve deploying groups of remote servers and/or software networks that allow centralized data storage and online access to computer services or resources. These groups of remote serves and/or software networks can be a collection of remote computing services.

Mobile device can be a smart phone, tablet computer, wearable computer (e.g. a smart watch, a head-mounted display computing system, etc.). In one example, a mobile device can be a small computing device, typically small enough to be handheld having a display screen with touch input and/or a miniature keyboard.

Push notification service (e.g. Apple Push Notification Service (APNs), Google Cloud Messaging (GCM), etc.) can forward notifications of third party applications (e.g. an application message server) to the mobile devices. The push notifications can include various media such as: badges, sounds or custom text alerts. The push notifications may be limited in size (e.g. a maximum size allowed for a notification payload may be two (2) kilobytes).

Exemplary Methods

FIG. 1 illustrates a process 100 of designating one or more recipients for a bulk application message, according to some embodiments. Process 100 can provide an extension of bulk messaging wherein a recipient can respond to designated recipient (i.e. entity that receives responses from bulk message recipients) associated with a sending entity. In one example, an application messaging service can provide a web interface that enables a user to implement process 100 (e.g. an administrator can filter and select specified users by location, region, department (e.g. department id, a specified call center, etc.), demographics, employments status/rank/description, and the like. In step 102, a list of application message addressees and designated reply addressee is generated. In step 104, an application message is sent to addressees. In step 106, a reply message(s) from addressees is received. In step 108, a reply message(s) is communicated to designated reply addressee. In some examples, the responses/replies can be in a one-to-one and/or one-to specified group (e.g. subset of users designated to respond) format. Process 100 can also optionally include a step (not shown) that sends a confirmation message to the designated recipient that the message was opened/viewed by the receiving user(s).

Process 100 can be extended to include bulk-message recipients that are external the enterprise using the application message system or other system that uses proprietary messaging applications. For example, the entity can send out the bulk message in a variety of electronic message formats (e.g. email, SMS, MMS, etc.). The responses can be received by the application message server. Natural language processing algorithms and machine learning systems can be used to parse (responses go to a general mailbox where the headers can be parsed, etc.), index and classify the responses from the bulk-message recipients. In this way, the responses (e.g. in email, SMS formats) are returned to the application message server and translated into the appropriate in-application messaging format. The in-application messages can then be forwarded to the designated recipient to responses from bulk messages. Process 100 can be extended to include online social-networking messages. For example, microblog posts and/or other online social-networking messages (e.g. Facebook® messages, LinkedIn® messages, etc.) addressed to an entity can be rerouted as in-application messages to a specified person within the entity.

When mobile devices are in offline mode they cannot send or receive messages. However, there are a variety of scenarios where mobile devices are in temporary offline mode (e.g. a user is travelling through a tunnel or going through an area with low bandwidth). The concept here is how we let users still message even in these low or no bandwidth situations without having to worry about network conditions and make the apps oblivious to network.

Figure 2:
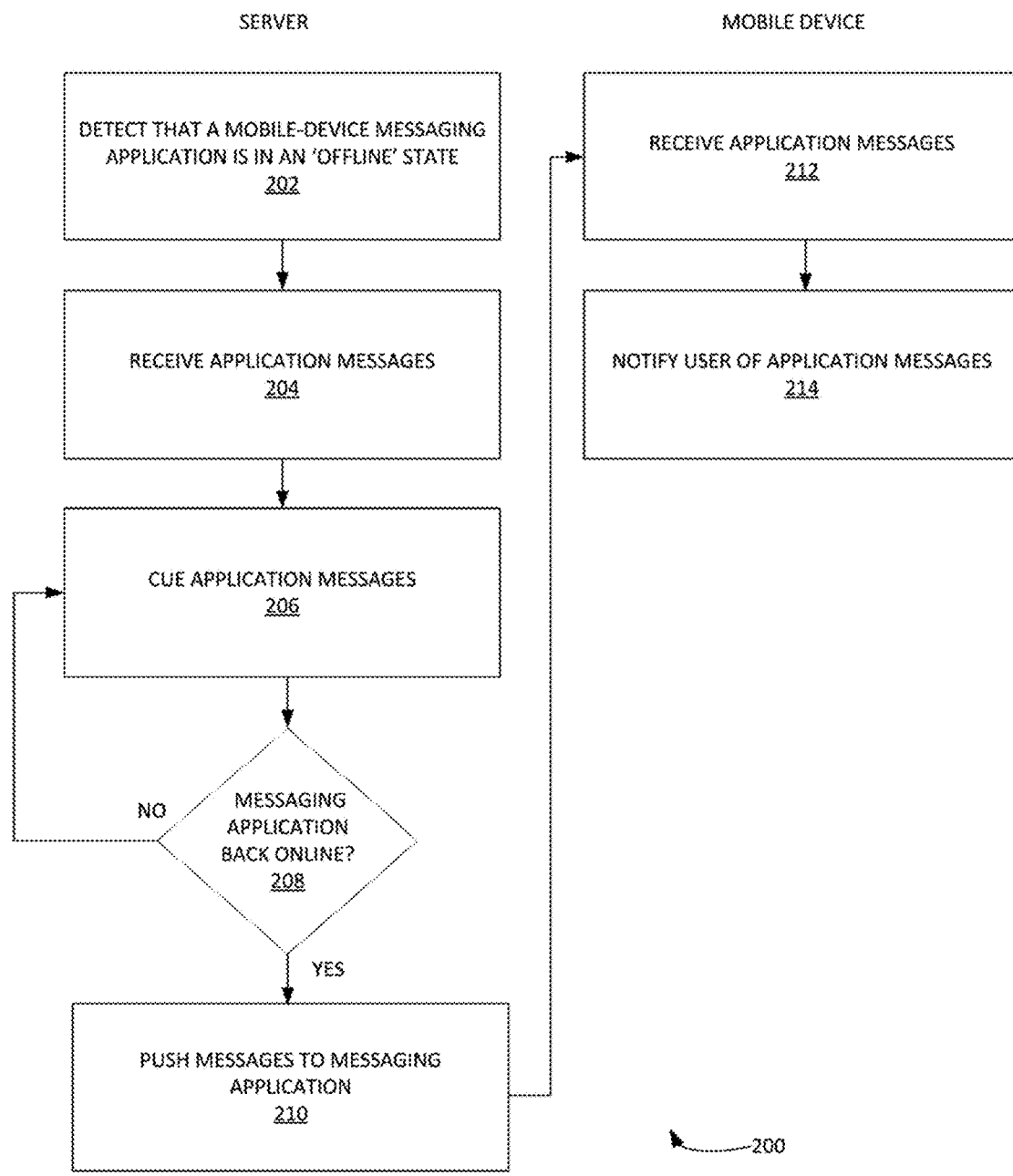
FIG. 2 illustrates an example process for utilizing a push notification service to push application messages to a mobile device, according to some embodiments.

FIG. 2 illustrates an example process for implementing an application messing service when a message application is temporarily offline (or in extremely slow network connections), according to some embodiments. In step 202 of process 200, it can be detected that a mobile-device messaging application (e.g. an instant messaging app for smartphones that operates under a subscription business model, an SMS/MMS application, etc.) is in an 'offline' state. For example, an application message can be forwarded to a message application running in a mobile device and an acknowledgement message may be not received. Message applications can be offline in a variety of circumstances such as, inter alia: the mobile device is not connected to a cellular and/or other computerized-communication network, the messaging application is not in memory of the mobile device, etc. In step 204, application messages can be received by the application message server. The application messages can be addressed to the offline message application. In step 206, the application messages can be cued in the application-messaging server. It is noted that the application message server can be implemented in a cloud-computing platform. In step 208, it can be determined whether the messaging application back online. If 'no', then process 200 can return to step 206. If 'yes', then process 200 can continue to step 210. In step 210, the application message server can push messages to the messaging application in the mobile device (e.g. via a push notification service). The application message server can detect that the message application is back online in a variety of ways. For example, the message application can notify the application message server when it comes back online. In another example, the application message server can send the operating system of the mobile device a push notification via a push notification service (e.g. see process 200 infra). Example operating systems can include: iOS®, Android®, BlackBerry OS®, BlackBerry 10®, Windows® Phone, Nokia Series 40®, Symbian®, etc. In step 212, the application message server in the mobile device can receive application messages. In step 214, the user can be notified of received application messages (e.g. via the display of the mobile device, via a sound alert, etc.).

It is noted that the application message server can determine a current available bandwidth for the mobile device. If the available bandwidth falls below a specified threshold, the application server can send a hyperlink as a push notification to the mobile device. The hyperlink can then later be used by the user of the mobile device to access the cued application messages once the user has access to higher and/or more reliable bandwidth. It is further noted that all and/or a portion of the cued application messages can be included in the push notification based on an allowed size of the push notification. The push notification can further include an instruction for the mobile device's operating system to bring the message application into the mobile device's memory and provide the included application message content to the message application. In some examples, the operating system need not be explicitly instructed to bring the messaging application online, but rather it is known that the operating system gives a window for the messaging application to receive and process the sent cued application messages based on the push notification itself. These optimizations can also be implemented by process 200 infra.

Figure 3:
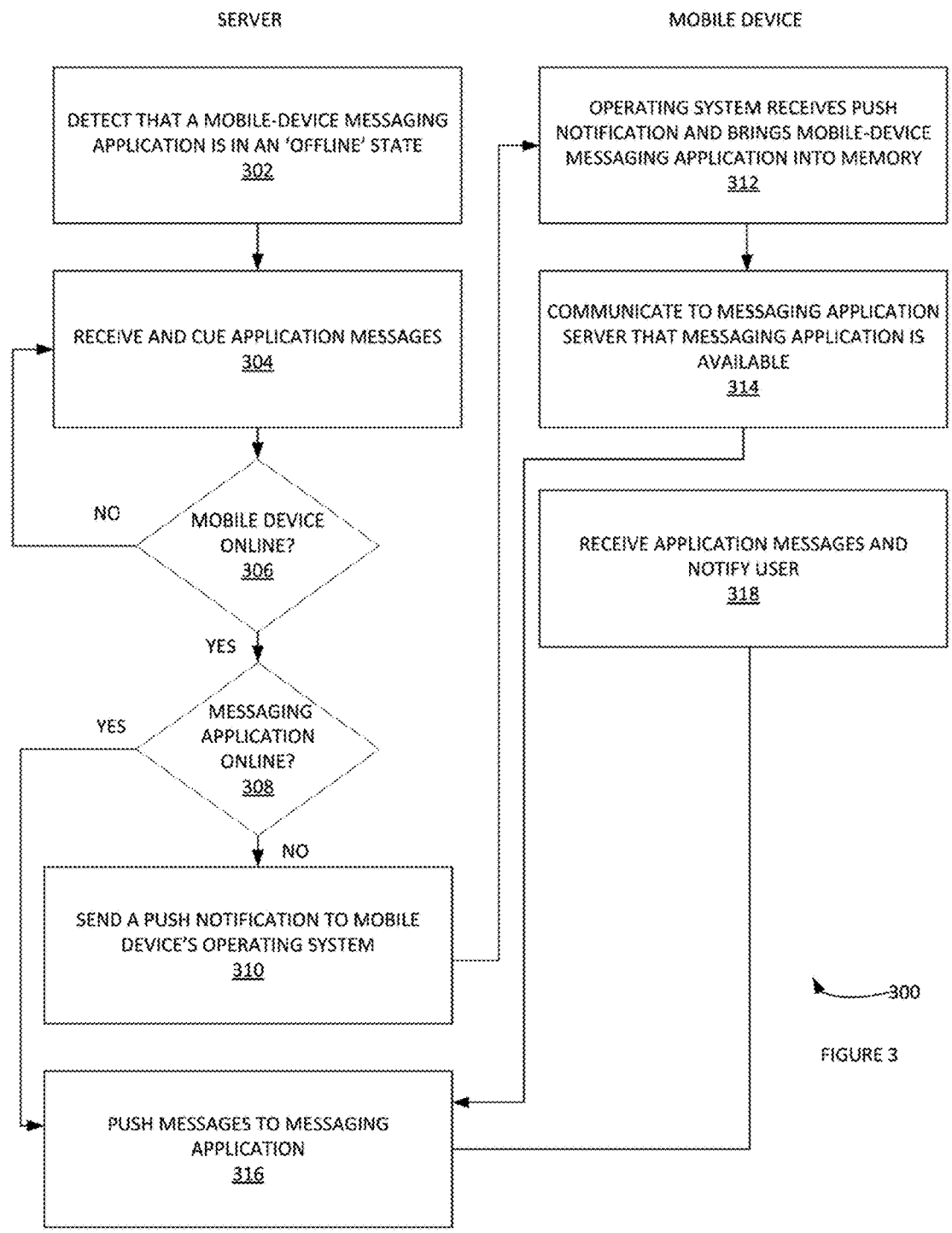
FIG. 3 illustrates a process of designating one or more recipients for a bulk application message, according to some embodiments.

FIG. 3 illustrates an example process 300 for utilizing a push notification service (e.g. Apple push notification service, etc.) to push application messages to a mobile device, according to some embodiments. The main things that really matter to the user on their mobile phones is bandwidth and battery. So the idea here is to provide ways to send and receive messages in low bandwidth situations without burning too many CPU cycles (and battery). We utilize push notifications effectively to signal to the application to wake up to retrieve messages instead of constant polling for messages.

In step 302 it can be detected that a mobile-device messaging application is in an 'offline' state. In step 304, application messages received and/or cued. In step 306, it can be determined if the mobile-device application is back online. If 'yes', then process 300 can repeat 304. If 'no' then process 300 can proceed to step 308. In step 308 it can be determined if the messaging application is back online. If 'yes', then process 300 can proceed to step 316, if 'no', then, in step 310, a push notification can be sent to mobile device's operating system. The push notification can cause the mobile device's operating system to bring the messaging application back online in step 312. In step 314, operating system receives push notification and brings mobile-device messaging application into memory. In step 316, the application messages can be pushed to messaging application. In step 318, the application messages can be received and displayed to the user.

Businesses today use bulk SMS to send new product information, pricing information or other time sensitive information to their sales, partner teams. The main challenge here is they have no visibility into the delivery of messages, who has read or not read the message and to provide a channel for responding to queries. Also most existing modes of broadcast tend to be simple text and you cannot send rich content with images, videos etc. Application messages can be sent as bulk messages (e.g. bulk instant messages, bulk SMS and/or MMS messages, etc.). For example, a business enterprise can utilize the application message system to send application messages to specified segments (e.g. the sales department, the employees in a specific geographic region, etc.). The business enterprise may want to receive responses from the recipients of the bulk application message. An application message administrator can specify a recipient(s) to the responses. The recipient(s) need not be the same entity that is classified as the sender of the bulk application message. For example, the sender can be designated as the vice president of sales. The recipients can be the sales representatives for the business entity in California. The designated recipient can be a regional sales manager's assistant and not the vice president of sales. Accordingly, when a sales representative responds, the message thread of the application message will include the regional sales manager's assistant and not the vice president of sales.

Example Computing Systems

Figure 4:
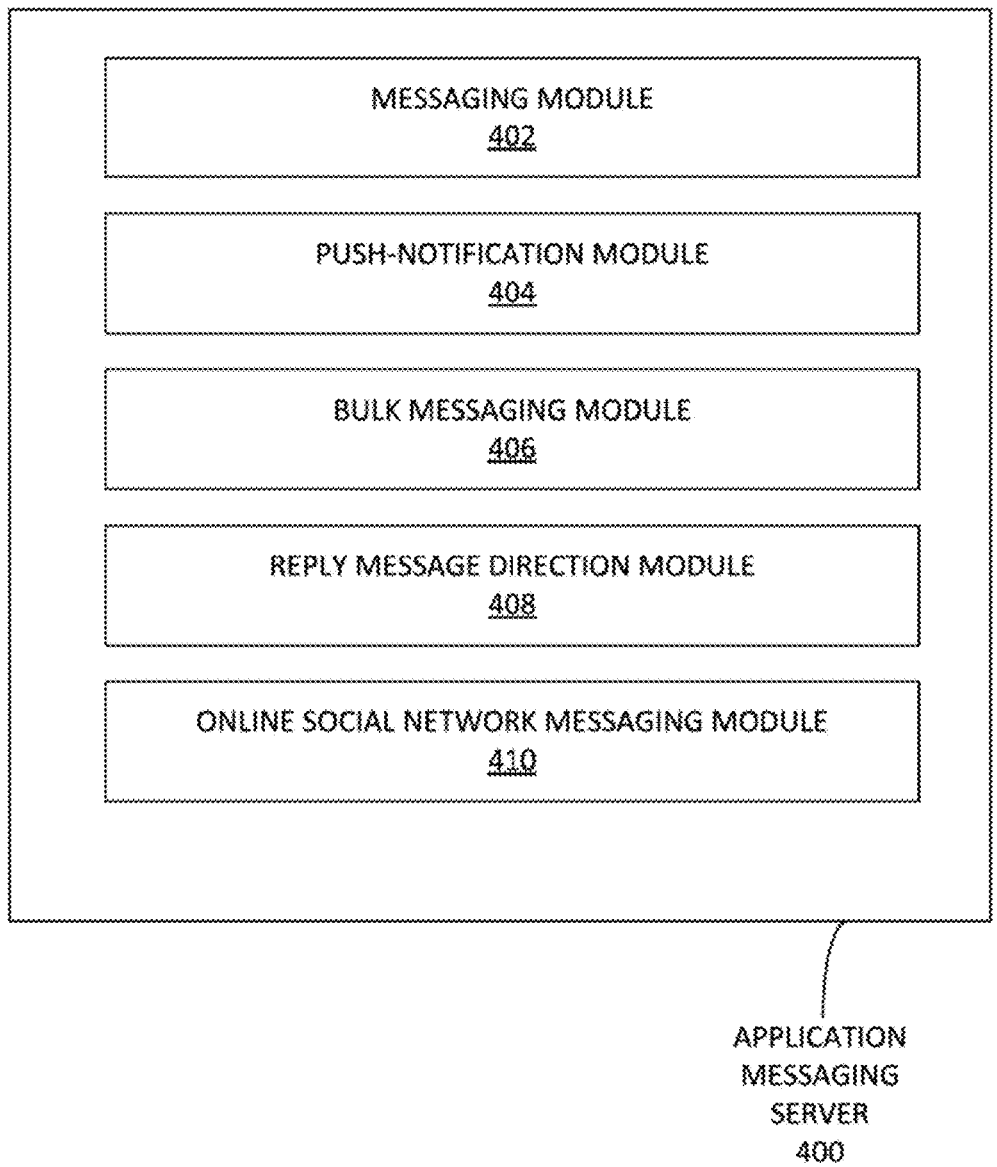
FIG. 4 illustrates, in block diagram format, an example application message server, according to some embodiments.

FIG. 4 illustrates, in block diagram format, an example application message server 400, according to some embodiments. Application message server 400 can include various server-side functionalities for implementing process 100, 200 and/or 300. Application message server 400 can include a messaging module 402. Messaging module 402 can manage the generation, communication and storage of application messages. Push notification module 404 can generate and communicate push notification messages (e.g. depending in operating system in mobile device). Bulk messaging module 406 can manage various bulk messaging applications. Bulk messaging module 406 can provide a web display to user for generating bulk messages and designated who will receive responses to bulk messages. Reply message direction module 408 can parse incoming responses/replies to bulk messages and direct said responses to the appropriate recipients. Online social networking 410 can interact with online social networking servers to obtain online social networking messages. These messages can then be forwarded as application messages to appropriate application message system users.

Additionally, application message server 400 can include other functionalities such as web servers, SMS servers (and external applications that connects to a Short Message Service Center (SMSC) to engage in the sending and/or receiving of SMS messages), MMS servers (and external applications that connects to a Multimedia Message Service Center (MMSC) to engage in the sending and/or receiving of MMS messages), IM servers, database managers, databases, email servers, natural language processing modules, machine-learning modules, linear regression modules, geo-location modules, application programming interfaces, etc.

The application message comprises a digital survey for display within an application message addressee's mobile device, and wherein an application message addressee can enter one or more responses to the digital survey. The designated reply addressee is designated based on a company position. A plurality of reply addressees are designated. The plurality of reply addressees are designated based on membership in a company department. The plurality of reply addressees are designated based on a geographic region associated with the company department.

Figure 5:
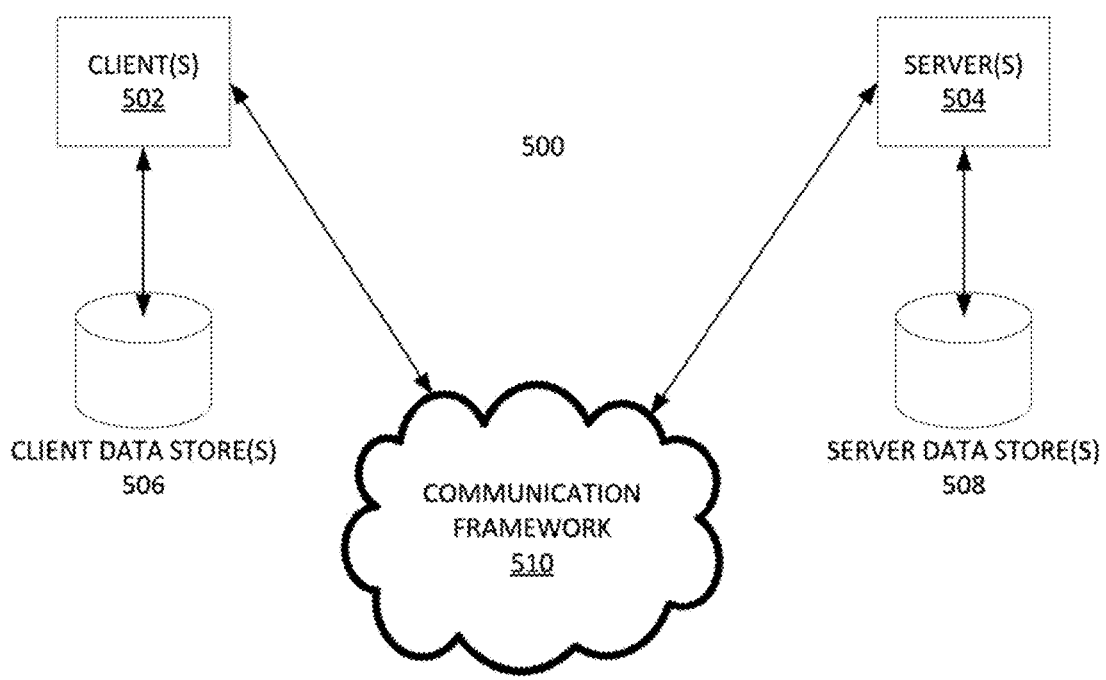
FIG. 5 depicts an exemplary computing system that can be configured to perform any one of the processes provided herein.

FIG. 5 is a block diagram of a sample-computing environment 500 that can be utilized to implement various embodiments. The system 500 further illustrates a system that includes one or more client(s) 502. The client(s) 502 can be hardware and/or software (e.g., threads, processes, computing devices). The system 500 also includes one or more server(s) 504. The server(s) 504 can also be hardware and/or software (e.g., threads, processes, computing devices). One possible communication between a client 502 and a server 504 may be in the form of a data packet adapted to be transmitted between two or more computer processes. The system 500 includes a communication framework 510 that can be employed to facilitate communications between the client(s) 502 and the server(s) 504. The client(s) 502 are connected to one or more client data store(s) 506 that can be employed to store information local to the client(s) 502. Similarly, the server(s) 504 are connected to one or more server data store(s) 508 that can be employed to store information local to the server(s) 504. In some embodiments, system 500 can instead be a collection of remote computing services constituting a cloud-computing platform.

Figure 6:
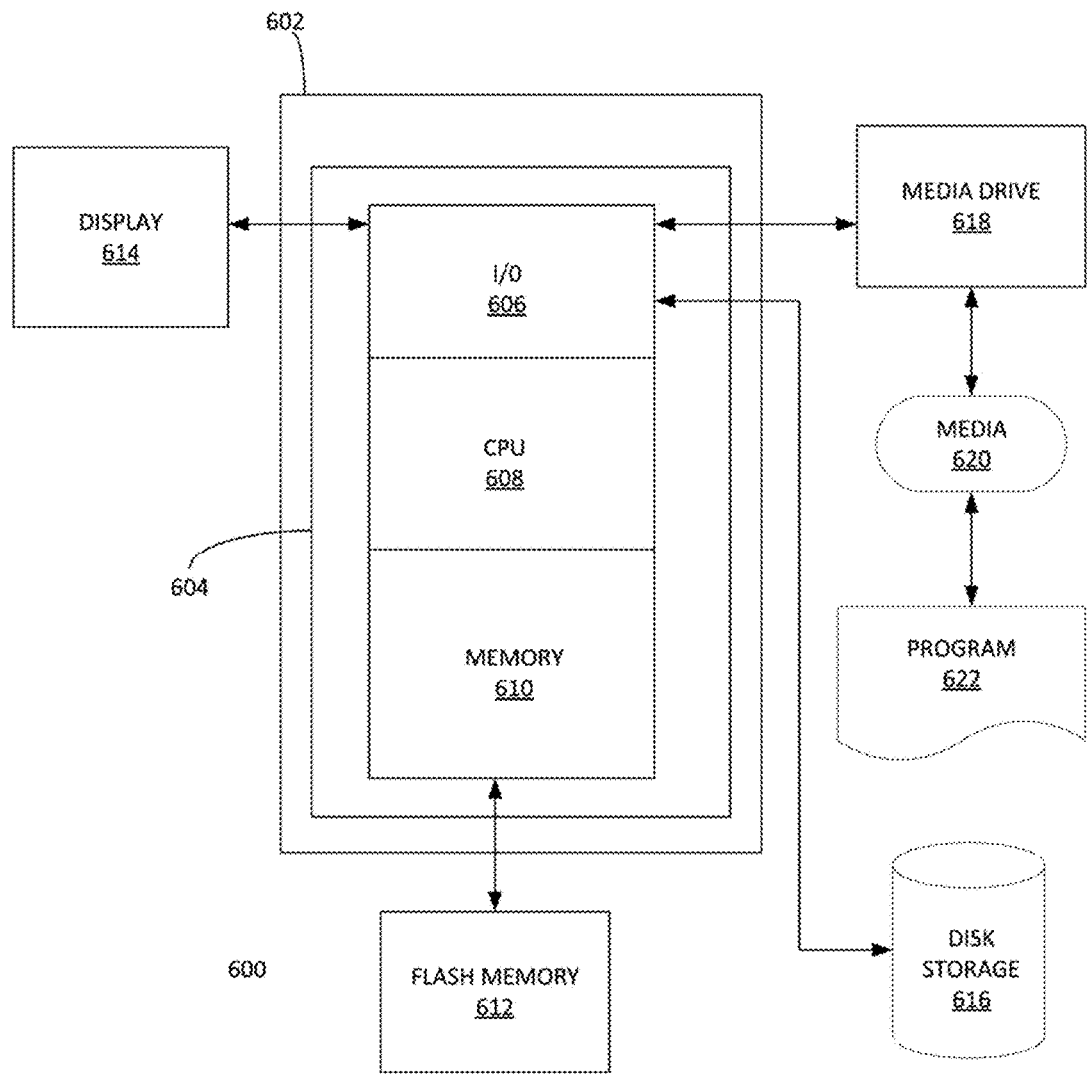
FIG. 6 is a block diagram of a sample-computing environment that can be utilized to implement various embodiments.

FIG. 6 depicts an exemplary computing system 600 that can be configured to perform any one of the processes provided herein. In this context, computing system 600 may include, for example, a processor, memory, storage, and I/O devices (e.g., monitor, keyboard, disk drive, Internet connection, etc.). However, computing system 600 may include circuitry or other specialized hardware for carrying out some or all aspects of the processes. In some operational settings, computing system 600 may be configured as a system that includes one or more units, each of which is configured to carry out some aspects of the processes either in software, hardware, or some combination thereof.

FIG. 6 depicts computing system 600 with a number of components that may be used to perform any of the processes described herein. The main system 602 includes a motherboard 604 having an I/O section 606, one or more central processing units (CPU) 608, and a memory section 610, which may have a flash memory card 612 related to it. The I/O section 606 can be connected to a display 614, a keyboard and/or other user input (not shown), a disk storage unit 616, and a media drive unit 618. The media drive unit 618 can read/write a computer-readable medium 620, which can contain programs 622 and/or data. Computing system 600 can include a web browser. Moreover, it is noted that computing system 600 can be configured to include additional systems in order to fulfill various functionalities. Computing system 600 can communicate with other computing devices based on various computer communication protocols such a Wi-Fi, Bluetooth® (and/or other standards for exchanging data over short distances includes those using short-wavelength radio transmissions), USB, Ethernet, cellular, an ultrasonic local area communication protocol, etc. System 400 and processes 100-300 can be implemented with systems 500 and 600.

CONCLUSION

Although the present embodiments have been described with reference to specific example embodiments, various modifications and changes can be made to these embodiments without departing from the broader spirit and scope of the various embodiments. For example, the various devices, modules, etc. described herein can be enabled and operated using hardware circuitry, firmware, software or any combination of hardware, firmware, and software (e.g., embodied in a machine-readable medium).

In addition, it can be appreciated that the various operations, processes, and methods disclosed herein can be embodied in a machine-readable medium and/or a machine accessible medium compatible with a data processing system (e.g., a computer system), and can be performed in any order (e.g., including using means for achieving the various operations). Accordingly, the specification and drawings are to be regarded in an illustrative rather than a restrictive sense. In some embodiments, the machine-readable medium can be a non-transitory form of machine-readable medium.

What is claimed as new and desired to be protected by Letters Patent of the United States is:

1. A computerized method for implementing an application messaging service comprising:
   providing a messaging application, in a mobile device, that enables a user to generate an application message;
   receiving list of application message addressees;
   receiving a designated reply addressee;
   communicating the application message to the application message addressees in the list of application message addressees;
   receiving one or more replies from one or more of the application message addressees and
   communicating the one or more replies from one or more of the applications message addressees to the designated reply addressee,
   wherein the application message comprises a digital survey for display within an application message addressee's mobile device, and wherein an application message addressee can enter one or more responses to the digital survey,
   wherein the designated reply addressee is designated based on a company position,
   wherein the plurality of reply addressees are designated based on membership in a company department,
   wherein the plurality of reply addressees are designated based on a geographic region associated with the company department, and
   sending a confirmation message to the designated reply addressee when the application message is accessed by the application message addressee.

2. The computer implemented method of claim 1 wherein the confirmation message includes a set of statistics comprising information about a proportion of the application message addressee that accessed the message.

3. The computer implemented method of claim 1 wherein the confirmation message includes a summary of answers to the digital survey included in the application message.

4. A computer system for implementing an application messaging service comprising:
   memory configured to store set of instructions used to implement the search; and
   one or more processors configured to:
   provide a messaging application that enables a user to generate an application message;
   receive a list of application message addressees;
   receive a designated reply addressee;
   communicate the application message to the application message addressees in the list of application message addressees;
   receive one or more replies from one or more of the application message addressees; and
   communicate the one or more replies from one or more of the application message addressees to the designated reply addressee,
   wherein the application message comprises a digital survey for display within an application message addressee's mobile device, and wherein an application message addressee can enter one or more responses to the digital survey,
   wherein the designated reply addressee is designated based on a company position,
   wherein the plurality of reply addressees are designated based membership in a company department,
   wherein the plurality of reply addressees are designated based on a geographic region associated with the company department, and
   send a confirmation message to the designated reply addressee when the application message is accessed by the application message addressee.

* * * * *